United States Patent [19]
Aoyagi et al.

[11] Patent Number: 5,894,378
[45] Date of Patent: Apr. 13, 1999

[54] CRASH STOP SHOCK RING FOR THE PROTECTION OF DISK DRIVE MOTOR BEARINGS

[75] Inventors: Akihiko Aoyagi, Fujisawa-Ken, Japan; Zine-Eddine Boutaghou, Rochester, Minn.; Vijayeshwar Das Khanna, Ossining, N.Y.; Suresh Kumar, Peekskill, N.Y.; Muthuthamby Sri-Jayantha, Ossining, N.Y.

[73] Assignee: International Business Machines Corporation, Armonk, N.Y.

[21] Appl. No.: 08/977,908

[22] Filed: Nov. 25, 1997

Related U.S. Application Data

[62] Division of application No. 08/504,882, Jul. 20, 1995, abandoned, which is a continuation of application No. 08/188,178, Jan. 28, 1994, abandoned.

[51] Int. Cl.$^6$ .......................... G11B 17/28; G11B 19/20; H02K 7/102
[52] U.S. Cl. .................... 360/99.08; 360/98.07; 360/99.04; 310/67 R; 310/328
[58] Field of Search .................. 360/99.08, 99.04, 360/98.07, 98.01, 98.02, 98.06; 310/90, 67 R, 77, 92, 93, 311, 316, 317, 323, 328; 369/234, 235, 236, 237, 258, 261, 268, 269, 270

[56] References Cited

U.S. PATENT DOCUMENTS

| | | | |
|---|---|---|---|
| 2,182,012 | 12/1939 | Bunnell | 308/35 |
| 2,352,911 | 7/1944 | Opslack | 308/35 |
| 3,445,146 | 5/1969 | Alexander et al. | 308/35 |
| 3,460,873 | 8/1969 | Roney | 308/35 |
| 3,897,987 | 8/1975 | Colao | 308/184 R |
| 4,150,407 | 4/1979 | Dijkstra | 360/106 |
| 4,654,725 | 3/1987 | Wakaizumi | 360/97 |
| 4,698,709 | 10/1987 | Ihlenburg et al. | 360/104 |
| 4,764,829 | 8/1988 | Makina | 360/106 |
| 4,890,027 | 12/1989 | Bohner et al. | 310/328 |
| 4,893,206 | 1/1990 | Shtipelman et al. | 360/106 |
| 4,938,610 | 7/1990 | Kato | 384/126 |
| 4,996,613 | 2/1991 | Hishida | 360/99.08 |
| 5,027,241 | 6/1991 | Hatch et al. | 360/105 |
| 5,039,900 | 8/1991 | Nashiki et al. | 310/328 |
| 5,227,686 | 7/1993 | Ogawa | 360/99.08 |
| 5,355,373 | 10/1994 | Salmon et al. | 310/71 |

FOREIGN PATENT DOCUMENTS

| | | |
|---|---|---|
| 0304397 | 2/1989 | European Pat. Off. . |
| 0370395 | 5/1990 | European Pat. Off. . |
| 0481632A2 | 4/1992 | European Pat. Off. . |
| 2707352 | 8/1978 | Germany . |
| 55-70971 | 5/1980 | Japan . |
| 4-157665 | 5/1992 | Japan . |
| 311338 | 1/1956 | Switzerland . |
| 773707 | 10/1980 | U.S.S.R. . |
| 1243026 | 7/1986 | U.S.S.R. . |
| 462479 | 3/1937 | United Kingdom . |
| 2187031 | 8/1987 | United Kingdom . |
| 2223544 | 4/1990 | United Kingdom . |

OTHER PUBLICATIONS

Patent Abstracts of Japan, vol. 013, No. 375 (P–21), Aug. 21, 1989 (JP 01 128274 A, May 19, 1989).

Primary Examiner—Stuart S. Levy
Assistant Examiner—David L. Ometz
Attorney, Agent, or Firm—Matthew J. Bussan; Laurence R. Letson

[57] ABSTRACT

A technique for preventing damage to ball bearings in small form factor devices where the drive motor has at least one piezoelectric crash stop ring disposed about the shaft and inside the rotor of the motor. The crash stop ring must be dimensioned to permit only a small amount of movement of the rotor relative to the shaft. The permitted movement is less than the minimum movement which would cause damage to the elements of the ball bearing.

3 Claims, 7 Drawing Sheets

CRASH STOP SHOCK RING FOR THE PROTECTION OF DISK DRIVE MOTOR BEARINGS

This application is a divisional of application Ser. No. 08/504,882, filed Jul. 20, 1995, now abandoned, which is a continuation of application Ser. No. 08/188,178, filed Jan. 28, 1994, now abandoned.

FIELD OF THE INVENTION

This invention relates to the prevention of damage to ball bearings in high precision disk drive assemblies and more specifically to the prevention of ball bearing damage in small ball bearings caused by shock impacts.

BACKGROUND OF THE INVENTION

As precision devices such as disk drives are reduced in size, the components of the disk drive assembly likewise must be reduced in size. Whenever the ball bearings of the disk drive motor are made smaller to fit into the small form factor disk drives, the ability of the ball bearing assemblies to withstand impact and shock forces is significantly reduced. Although the design of the component, specifically the ball bearing, may be substantially the same as the design for its larger predecessor counterpart, the reduced load rating of the individual components of the ball bearing assembly cannot accommodate the same level of forces without experiencing failure as may be exerted onto the larger ball bearing assemblies. Because the precision manufacture of small form factor disk drives requires extremely fine tolerances and provides little allowance for deviations in performance, augmentation of the shock tolerance of the reduced size components is required in order that these disk drives be sufficiently rugged to withstand impacts and shocks which can be commonplace.

Shocks exerted onto the ball bearings can be axial, in the direction of the axis of the shaft on which the bearing is disposed; radial, substantially perpendicular to the axis of the shaft; or a combination of radial and axial should the impact force be exerted at a distance displaced from the plane of the ball bearing. In addition to the force factors of axial and radial force vectors, a moment or torquing about the ball bearing assembly can occur due to an off-line force coupled with one of the ball bearing assemblies acting as a pivot and the other ball bearing assembly being the source of the resistance to the moment. For ball bearings which absorb a substantially axial impact, the load of the impact is shared by all of the balls in the ball bearing assembly. However, if a ball bearing assembly is impacted in a radial direction, quite possibly only one of the balls of the ball bearing assembly may carry the entire load of the impact.

As the impact occurs in the radial direction, the force exerted on the outer race will impart a force to one or more of the balls placed between the outer race and the inner race, and then only on those balls which are resident in the semi-circular annular region between the outer and inner races and on the side of the shaft where the impact force is focused.

As will be appreciated whenever there are a small number of balls in the ball bearing assembly, six for example, and one of those balls is directly between the axis of the force impacting the outer race against the ball and toward the axis of the shaft, all or substantially all of the impact force will be carried by that single ball. As the force is transmitted against the inner race by the ball or balls positioned to carry the impact force, the shaft of the device, such as a disk drive for example, will resist any movement of the inner race. Depending on the magnitude of the shock or impact force, the material in the inner and outer races or the balls will begin to deform to a varying extent. Responding to a small force, the ball will tend to penetrate the respective race surfaces by a corresponding small amount. No damage will occur so long as the penetration of the ball into the race of the ball bearing assembly or the ball deformation is totally within the elastic limits of the material from which the inner and outer races are fabricated. Once the impact force has been dissipated and the ball bearing assembly returns to its unaffected state, the elastic nature of the deformation will permit the balls and races of the ball bearing to restore themselves to an unaffected shape and surface.

On the other hand, should the shock or impact force be sufficient to deform the inner and outer races or balls beyond their elastic limit and into a region of plastic deformation, the surface of the race or ball is deformed to the point where the race or ball surface will not resume its original configuration and thus will present an irregularity as the balls roll past the point of penetration causing vibration and runout of the bearing. Due to bearing vibration and runout, there is a resulting runout of the rotor of the disk drive motor. Since the rotor is attached to or is part of the hub which in turn supports the magnetic disks, there will be a correspondent runout of the disk. Runout of the disk is unacceptable beyond very small limits because the runout will cause recording track misregistration and it will be impossible to read data which has been previously recorded on the magnetic disk surface in a circular track of a precise radius.

Similarly, if data is being recorded on a disk which is experiencing runout beyond an acceptable limit, the recording track being laid down on the surface of the disk may not correspond to the position of the track at a future time as an attempt is made to read the data from the magnetic disk.

While the deformation in the inner and outer race surfaces may be only measurable in micro inches in a very small precision ball bearing, these small surface disruptions are sufficient to severely degrade the performance of the bearing and the device incorporating the bearing.

Due to manufacturing tolerances, design constraints as well as the inherent elasticity of the materials from which the bearings, shaft and the hub of the disk drive are manufactured, some very limited movement of the rotor may occur about and/or along an X or Y axis and along the Z axis, where the axis of rotation and the Z axis are coincident and the X and Y axis are radial to the shaft. Depending upon the point of impact or shock, the most likely motion will be a rotation of the rotor may occur about either or both of the X and Y axes. This rotation of the hub and consequently the inner and outer races will compress at least one ball in each of the ball bearing assemblies. Depending on the amount of the rotational movement and the spacing of the bearings, the compression may exceed the elastic deformation limit of the material of the races.

Where the bearing assemblies are both placed at positions near one end of the rotor and consequently one end of the shaft, the potential for bearing damage is increased. This increased potential for damage is due to the lever arm through which the impact force may act, thereby increasing the force on the balls and races. The only viable approach to preventing any damage caused by shock or impact forces is to cushion the device to absorb some or all of the forces or to block transmission of the forces to the bearing assemblies.

SUMMARY OF THE INVENTION

It is an object of the invention to limit the damage to ball bearing assemblies which may result from impact or shock forces.

It is another object of the invention to limit the undesirable movement of the rotor of a motor having precision ball bearings therein along or about the X and/or Y axis or along the Z axis where the Z axis and the axis of rotation of the rotor are coincident.

It is another object of the invention to eliminate such detrimental rotational motion of the rotor about the X and Y axis by blocking such movement.

It is a still further object of the invention to eliminate such movement about the X and Y axis by clamping the rotor with respect to the stator.

By limiting rotor movement in directions other than the desired rotation about the designated axis of rotation, the Z axis herein, compression of the bearing balls against the races is limited. Limitation of such undesired movement may be approached in one of several ways.

One approach is to dispose a crash stop ring about the stator or shaft of the motor and inside the interior diameter of the rotor. The exterior surface of such a crash stop ring confronts the interior surface of the rotor. If the rotor attempts to rotate about an X or Y axis or move along the X and/or Y axis or a combination thereof, the crash stop ring will move, relatively, into confrontational engagement with the interior surface of the rotor thus preventing the rotor from any further unwanted and detrimental rotational or translational movement. The crash stop ring and bearing assemblies will share the impact or shock forces thus reduce the loading on the bearing components to enhance the likelihood of no damage to the bearing.

For damage to the race surfaces to occur, the outer race must be moved by an amount that will translate into damaging penetration of the ball into the race surface, leaving surface irregularities on the races. The spacing between the exterior surface of the crash stop ring and the interior surface of the rotor is designed to be less than the distance that the rotor must be displaced to exceed the elastic deformation limits of the bearing races. By permitting the rotor to move a small amount and still remain within the elastic deformation limits of the inner and outer race materials, the rotor may be moved into engagement or contact with the crash stop ring. Once the crash stop ring is engaged with the rotor structure, the crash stop ring will resist any additional movement of the rotor. Since the crash stop ring is solid, its compressionability will be significantly less than the compressionability of the ball bearing assembly. Accordingly, at least some of the impact forces will be transmitted to and borne by the crash stop ring to the shaft or stator of the disk drive motor. While some forces will continue to be exerted onto the ball or balls of the ball bearing assemblies, the forces will be sufficiently limited to prevent deformation in the inner and outer races not to exceed the elastic deformation limits of the material.

Once the crash stop ring and the rotor are engaged with each other and the shock impact forces are being shared by the crash stop ring and transmitted to the shaft or stator, no further movement of the rotor with respect to the stator about either or both of the X or Y axes will be possible. Without any additional relative movement, there will be insufficient displacement of the outer race with respect to the inner race to cause any further penetration of the balls into the surface of either the inner race or the outer race, thereby suppressing any damage to either of the race surfaces or the balls of the ball bearing assembly.

The crash stop ring may be either a passive or an active device. In the case of a passive crash stop ring, the clearance between the external surface of the ring and the internal surface of the rotor is determined and fixed at the time of manufacture. The gap between the two surfaces is designed and constructed to be less than the distance that that portion of the rotor must move in order to cause damage to the bearings.

In the case of an active crash stop ring, the crash stop ring may be a composite formed of a shallow cup-shaped metal member having a central hole therein to accommodate the shaft of the stator and having an external cylindrical wall having a thickness sufficient to withstand impact of the rotor against the wall. The wall, as well as the radial flange portion of the ring, must be relatively thin in order to be deformed by an annular ring of piezoelectric material and then bonded into the interior of the shallow cup-shaped metal ring. The resultant composite ring then may be contracted by the piezoelectric ring portion when an electrical potential is applied thereto. The composite ring structure is fabricated to dimensions such that the outside diameter dimension of the composite crash stop ring in its relaxed state is slightly larger than the interior diameter of the rotor at the region where the crash stop ring engages the interior of the rotor, to effectively seize the rotor surface.

Further, the characteristics of the piezoelectric material are selected and the dimensions of the piezoelectric material are defined so that when the composite crash stop ring is provided with an electrical potential, the contraction of the piezoelectric material will be sufficient to pull the exterior diameter of the composite crash stop ring to a dimension of less than the interior diameter of the rotor thus effectively disengaging the crash stop ring from the rotor and permitting the rotor to turn freely about its axis of rotation.

When the electrical potential is removed from the composite crash stop ring, the ring will restore to its relaxed state and effectively grab or seize the interior surface of the rotor, not only preventing rotation of the rotor about its axis of rotation but also stabilizing the rotor, so that no movement of the rotor around or along either the X or Y axis may occur. It is recognized that piezoelectric materials, although solids, are compressible or deformable to some extent. However, the crash stop ring will absorb sufficient force to prevent damage to the ball bearing assemblies of the disk drive within the design criteria for the device and the bearings.

The crash stop ring also may be positioned exterior to the rotor if the exterior of the rotor is manufactured to sufficiently close tolerances to permit a closely fitting ring to encircle the rotor without affecting rotation of the rotor around the axis of rotation. The only other additional requirement would be that the necessary mounting structure for the ring exist and be compatible with the remainder of the design of the device in which the crash stop ring is included.

An additional embodiment of the crash stop ring stabilization of a rotor would include a flange extending in the radial direction from the rotor. A piezoelectric ring would be rigidly mounted on both sides of the flange to engage one of the planar surfaces of the flange when the piezoelectric ring is in the relaxed state. With two such crash stop rings disposed so that the rings can engage both planar surfaces of the flange, the rotor is effectively clamped between the two piezoelectric crash stop rings whenever the piezoelectric crash stop ring is disconnected from the power source used to contract the piezoelectric material in a direction parallel to the axis of rotation of the rotor. The piezoelectric material would be fabricated in such a way that the orientation of contraction would be substantially normal to the plane of the crash stop ring, and the material would be oriented, in the particular crash stop ring assemblies, to contract in a direction opposite that of the other crash stop ring so that the engaging surface of each crash stop ring can be withdrawn and disengaged from the surfaces of the rotor flange.

One significant characteristic of the composite piezoelectric crash stop ring structure is that the extent of contraction of the piezoelectric material and therefore of the composite ring structure may be controlled by the magnitude of the electrical potential applied thereto; therefore, the gap between the crash stop ring and the engaging surface of the rotor may be controlled during operation to present the smallest possible operating gap, if it is desired, to precisely control the gap between the crash stop ring and the rotor during the operation of the disk drive. At the time that the rotor and disks of the disk drive are brought to a standstill, the piezoelectric material is allowed to return to its relaxed state and seize the rotor.

A more complete and detailed understanding of the invention may be had by reference to the drawings and the detailed description of the invention to follow.

DRAWINGS

DETAILED DESCRIPTION OF THE PREFERRED EMBODIMENTS

Figure 1:
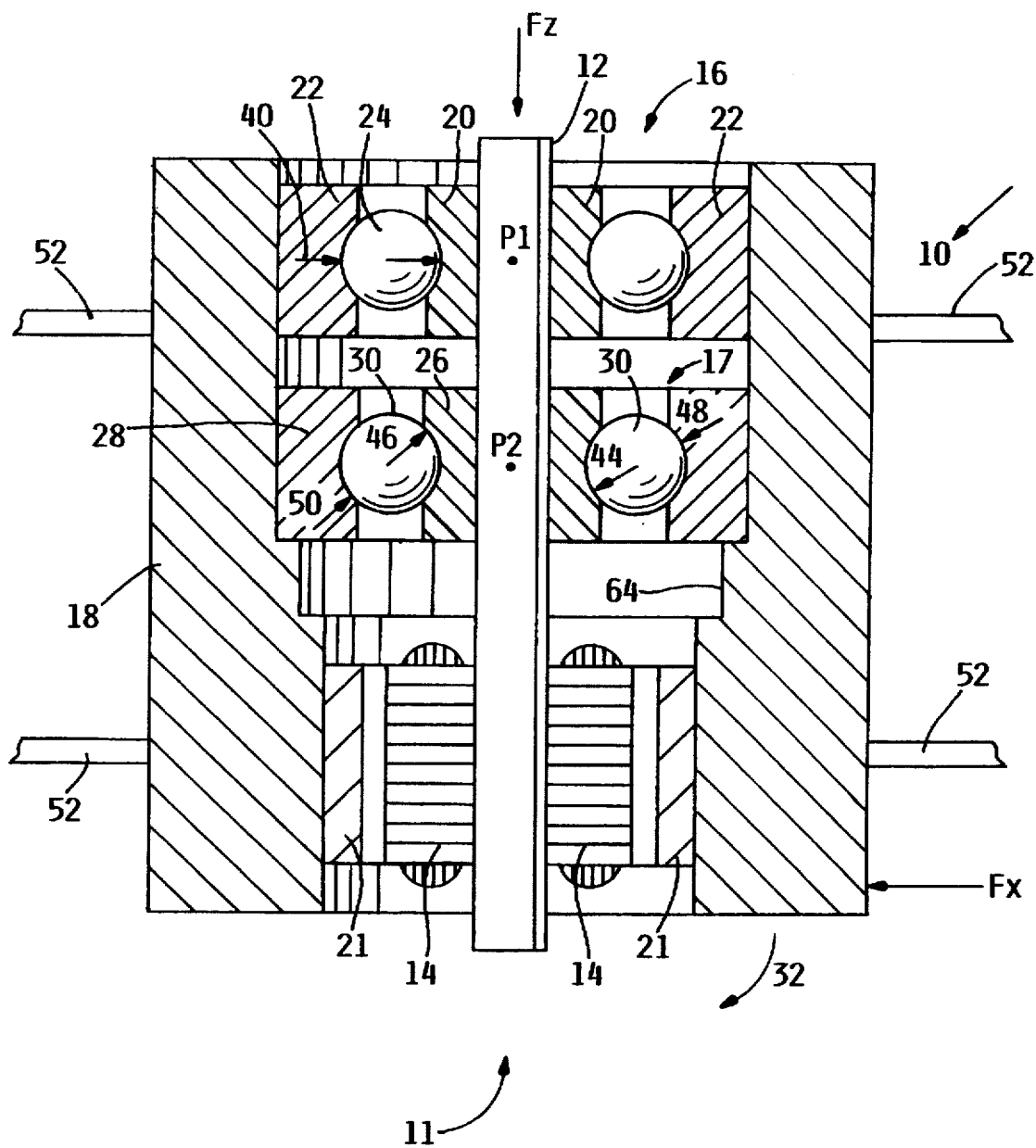
FIG. 1 illustrates a conventional spindle motor such as may be used in a disk drive.

Referring now to the spindle motor of FIG. 1, the spindle motor 10 is comprised of a shaft 12 carrying thereon a coil or coils 14 to create the magnetic field necessary to make the motor 10 operate. Surrounding shaft 12 are ball bearing assemblies 16, 17 which in turn support rotor 18. Rotor 18 carries on an interior surface 64 field magnets 21 to interact with the magnetic field generated by coil 14. Ball bearing assemblies 16, 17 surround shaft 12 and support rotor 18. Ball bearing assemblies 16, 17 are formed conventionally of inner races 20, 26, outer races 22, 28 and balls 24, 30, respectively. Balls 24, 30 engage the surfaces of races 20, 26 and 22, 28 in the form of a point contact. As a force is exerted onto the balls 24, 30 either by gravity acting upon the rotor 18 or due to the impacting of a shock force onto rotor 18 or through shaft 12, the engagement of the balls 24, 30 with the races 20, 26, 22, 28 changes from a point engagement to an elliptical shaped engagement due to the curvature of the races 20, 22, 26, 28 that encircle shaft 12.

By way of an example, an impact force is illustrated in its component parts by arrows Fx and Fz. Fz exerts a force substantially parallel to the axis of shaft 12. The force Fx is substantially perpendicular to the axis of shaft 12. If point P2 is taken as the pivot point for the purposes of analyzing the effect of force Fx, the force will be transmitted about point P2 and will result in the compression of race surface 22 onto ball 24 at the point indicated by the arrow 40 and the corresponding force will be transmitted from ball 24 at arrow 42 onto inner race 20. The tendency will be to spread the races 20 and 22 away from the remaining balls of the ball bearing assembly 16. Thus the major portion, if not the entire force on the races 20 and 22, will be concentrated at ball 24. As rotor 18 attempts to make a clockwise movement as indicated generally by arrow 32, about point P2, balls 30 will be compressed by the races 26, 28 in ball bearing assembly 17 and will exert forces at points and in the general direction of arrows 44 and 46 onto the inner race 26 and by outer race 28 onto the ball 30 as indicated by arrows 48 and 50. If sufficient movement of rotor 18 is permitted about point P2 in the direction of arrow 32 the forces exerted by balls 24 and 30 onto the respective races 20 and 26 will exceed the elastic limit of the materials from which the races 20, 26 are fabricated. A similar analysis may be made with respect to other pivot points such as P1.

Similarly, races 22 and 28 will exert forces created by the movement of rotor 18 in direction 32, and thus will cause balls 24 and 30 to penetrate the surfaces of races 22 and 28 to an extent that the penetration will cause deformation exceeding the elasticity of the race material and will accordingly pass into the plastic region thus permanently deforming the race surface.

A small deformation which is permanent then will cause vibration and runout during the disk drive operation. Runout in the bearing assemblies 16, 17 will cause a corresponding runout of rotor 18 and of disks 52 which are supported by and rotate with rotor 18. When runout occurs, track misregistration occurs between the tracks of data (not shown) written onto the magnetic disks 52 and a read/write head (not shown) which is positioned in extremely close proximity to and at precise radial distances from the axis of shaft 12. When track misregistration occurs, data that has already been stored on the disk 52 cannot reliably be retrieved and any data being written to the disk 52 during track misregistration then will be spatially misplaced and in all probability will not be retrievable at a later time if the runout proves to be non-repeatable or is manifested as vibration. Typical runout for small form factor disk drives 11 is in the range of two to three micro inches while an acceptable amount of runout is typically less than five to six micro inches. When runout exceeds the five to six micro inch limit, the reliability of reading and writing on rotating disk 52 is severely degraded and the disk drive 11 may become inoperable.

While force Fx is indicated as impacting onto rotor 18, it should be understood that if the disk drive 11 or the computer into which it is incorporated is dropped or shocked at an appropriate angle, shaft 12 will be the source of the shock with the inertia of the rotor 18 and disks 52 tending to create a force transmitted through the bearing assemblies 16, 17 which is analogous to or may be considered to be a force Fx exerted onto the rotor 18.

A similar analysis may be made for other locations and other orientations but from the foregoing, it can be readily understood that forces exerted onto the rotor 18 or onto the shaft 12 as a result of the inertia of rotor 18 may be transmitted through the races 20, 22, 26, 28 to the balls 24, 30 in the bearing assemblies 16, 17 and may potentially damage the surfaces of the races 20, 22, 26, 28 or balls 24, 30. Where the damage will occur first depends on the relative hardness of the balls 24, 30 and races 20, 22, 26, 28.

From FIG. 1, it is readily apparent that a significant amount of the shock or impact force Fx may be dissipated and absorbed by some method where the movement of rotor 18 in the direction indicated by arrow 32 is significantly restricted.

Since the penetration of the balls 24, 30 into the respective races 20, 22, 26, 28 is primarily a function of the movement of rotor 18, and the relative hardness of the balls 24, 30 and races 20, 22, 26, 28, for example in direction of arrow 32, the blocking of such movement in direction of arrow 32 will limit the compression of the elements of the ball bearing assemblies 16, 17 to the point where the balls 24, 30 will not excessively penetrate the surfaces of the races 20, 22, 26, 28 and accordingly also will prevent damage to the ball bearing assemblies 16, 17.

Figure 2:
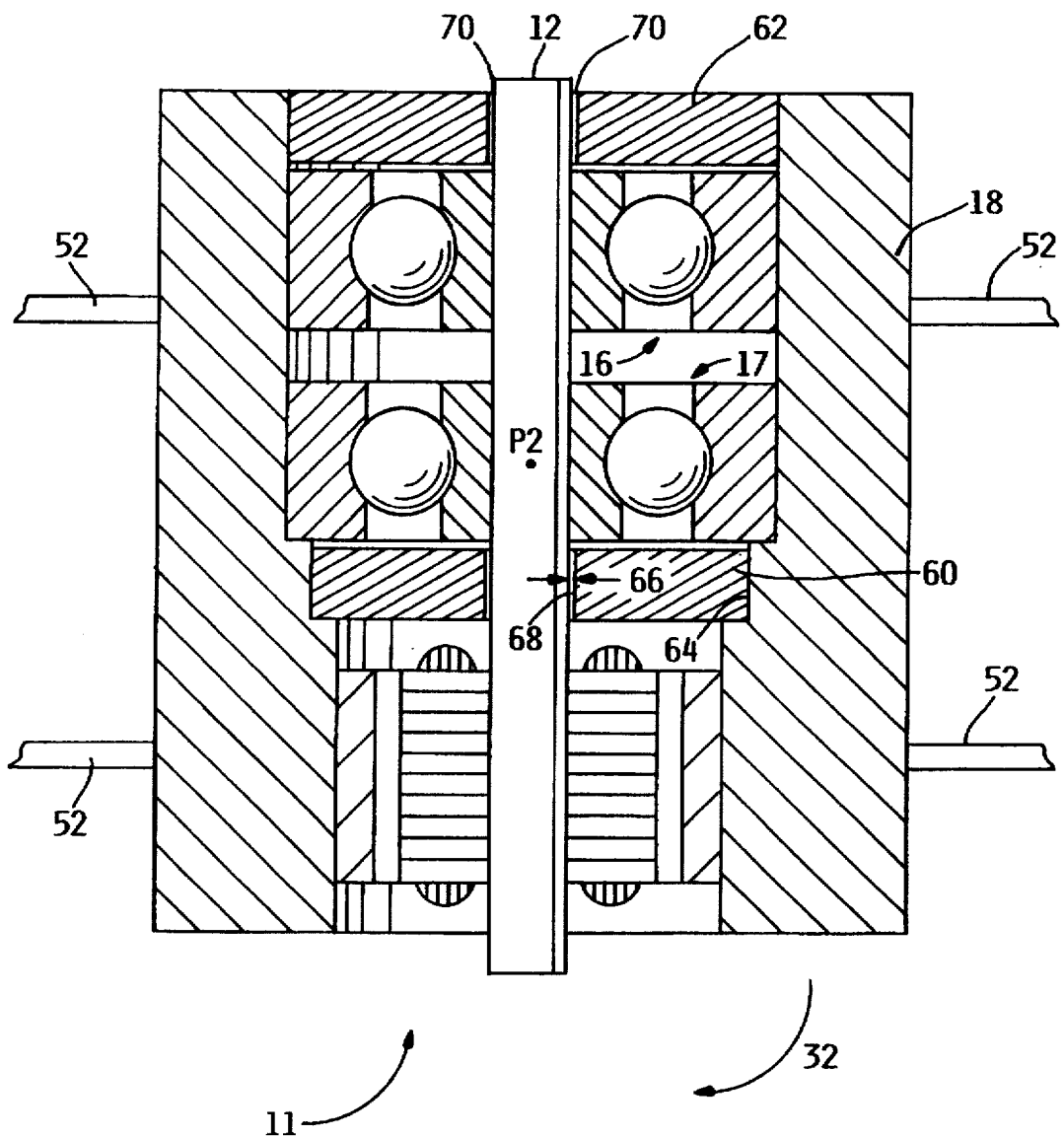
FIG. 2 is an illustration of the spindle motor of FIG. 1 wherein crash stop rings have been provided to reduce shock damage.

Referring now to FIG. 2, the spindle drive motor 10 of FIG. 1 is illustrated with crash stop rings 60 and 62. Crash stop ring 60 is inserted into engagement with and supported by the interior surface 64 of rotor 18. Crash stop ring 60 is fabricated to a dimension which will leave a small gap or clearance 66 between the inner diameter 68 of crash stop ring 60 and shaft 12. Similarly, crash stop ring 62 is inserted into and supported by the inner cylindrical surface 64 of rotor 18 and is manufactured to provide a gap 70 between crash stop ring 62 and shaft 12. The gaps 66 and 70 must be sufficient to prevent any inhibition of rotation of rotor 18 with respect to the shaft 12. However, when rotor 18 is attempted to be rotated about point P2 or any other similar point along the axis of shaft 12, stop ring 60 and stop ring 62 will be shifted substantially in a radial direction, toward the circumference of shaft 12 resulting in engagement when the gaps 66 and 70 are closed. Once either or both gaps 66, 70 are closed at any point between the shock ring 60 and 62 in shaft 12, further movement of rotor 18 in the direction indicated by arrow 32 is restricted. Thereafter, continued increases in the force level of force couple 44, 46 of FIG. 1 generated within the ball bearing assemblies 16, 17 is prevented and the force couples already existent when crash stop ring 60 or 62 engage shaft 12 are limited to forces less than that necessary to cause permanent plastic deformation of the components of bearing assemblies 16, 17.

Figure 3:
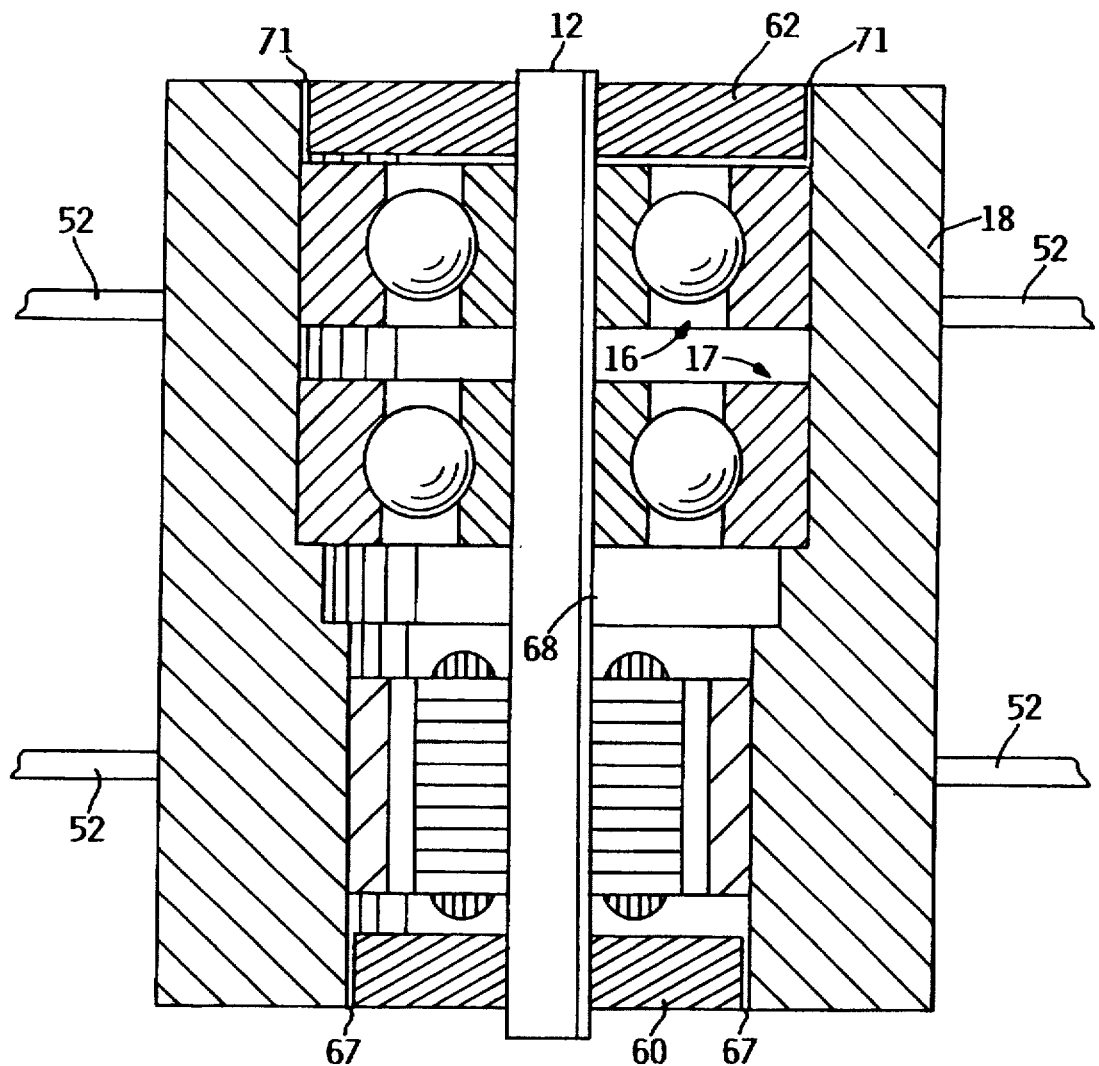
FIG. 3 illustrates another arrangement of the crash stop rings within the spindle motor illustrated in FIG. 1.

With reference now to FIG. 3, an embodiment is illustrated which is similar in function to the embodiment illustrated in FIG. 2. Crash stop ring 62 is engaged with and supported by a shaft 12. Crash stop ring 62 and rotor 18 define the narrow gap 71 and the crash stop ring is disposed adjacent to bearing assembly 16. Similarly, crash stop ring 60 is displaced from the position illustrated in FIG. 2 to a position near the lower extremity of rotor 18 as illustrated in FIG. 3. Similar to gap 71, gap 67 is located between crash stop ring 60 and rotor 18. Crash stop ring 60 also is engaged with and supported by shaft 12 in an analogous manner to that of crash stop ring 62. Due to the location of crash stop ring 60, displaced a greater distance from the ball bearing assemblies 16, 17, the gap 67 may be slightly enlarged over the corresponding dimension of gap 66 as shown in FIG. 2. Crash stop rings 60 and 62 in FIGS. 2 and 3 limit the rotation of rotor 18 about the X or Y axis, where the Z axis is coincident with the axis of shaft 12, and the axis of rotation of rotor 18.

Figure 4:
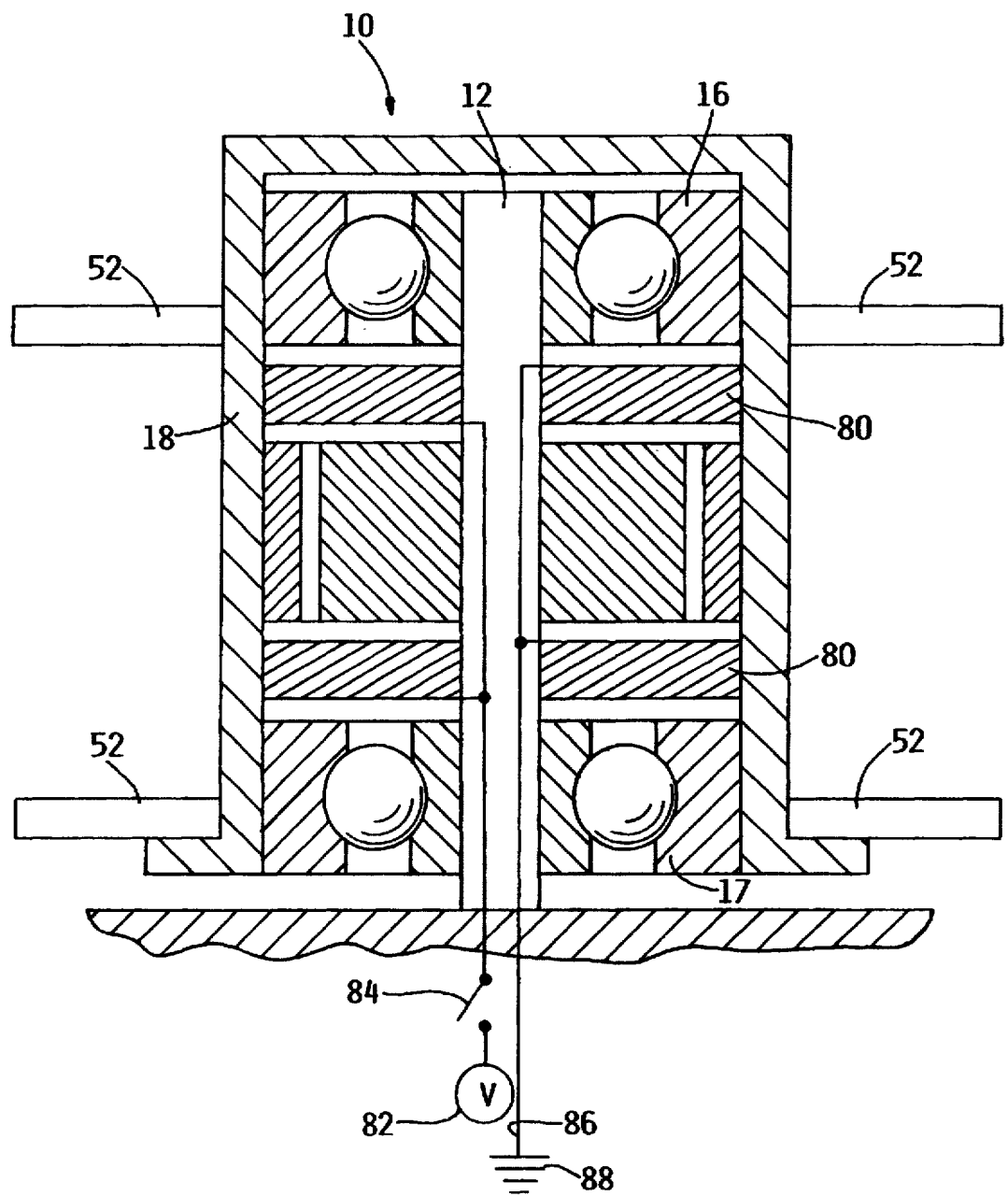
FIG. 4 illustrates an embodiment having crash stop rings disposed adjacent to the ball bearing assemblies of a spindle motor wherein the crash stop rings may be electrically controlled to engage and to disengage the spindle motor rotor.

An alternative embodiment of a crash stop ring installation is found in FIG. 4, reference to which is now made. Spindle motor 10 is illustrated having a fixed shaft 12 and rotor 18. The rotor 18 is supported on shaft 12 by ball bearing assemblies 16, 17. The remainder of the structure of the motor is conventional and accordingly will not be further described in detail.

Positioning the crash stop rings 80 between ball bearing assemblies 16, 17 is effective to perform the protective function even when flexure of the shaft would interfere with proper operation of the motor when the crash stop rings 60, 62 are positioned as in FIG. 3. This positioning applies to either solid or piezoelectric crash stop rings.

Figure 5:
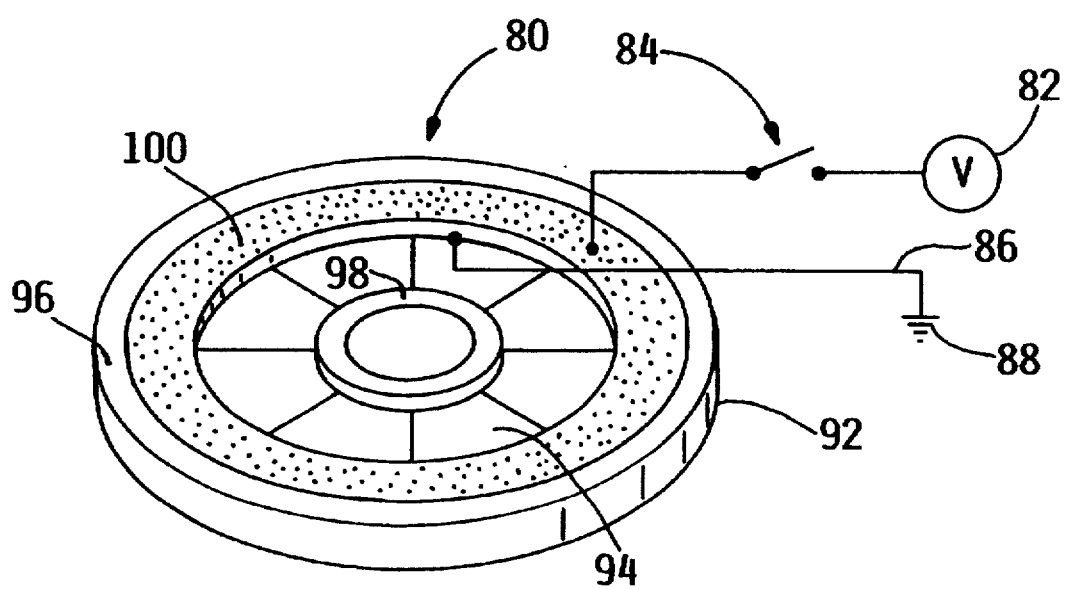
FIG. 5 illustrates a crash stop ring of the type found in the motor illustrated in FIG. 4.

Crash stop rings 80 are disposed intermediate and relatively closely disposed to ball bearing assemblies 16, 17. The crash stop rings 80 are fabricated to be supported on shaft 12 and to remain stationary therewith. In order to engage the interior surface 64 of rotor 18, a ring of variable and controllable outside diameter is provided. The crash stop ring 80 is a piezoelectric composite wherein a piezoelectric material is bonded to a metal support. The piezoelectric ring and metal support may be contracted by the application of a voltage 82. The control of the voltage 82 may be by a switch 84 which is schematically illustrated in FIG. 4. The completion of the circuit is by a conductor 86 leading to ground 88. By closing switch 84, voltage 82 is applied to the crash stop rings 80 thus causing them to contract. For a better understanding of the construction of a piezoelectric crash stop ring 80, reference is made to FIG. 5.

Ring 80 is fabricated from a shallow metal disk formed into the shape of a cup 92. The cup 92 is composed of a planar bottom wall 94 and a generally upstanding cylindrical outer wall 96. The cup 92 may further be provided with an inner cylindrical wall 98 to engage shaft 12. Disposed within the cavity of the crash stop ring 80 is a ring 100 of piezoelectric material such as quartz or lead-zirconate-titanate. Piezoelectric ring 100 is bonded to the inner surfaces of cup 92 so that any change in dimension of piezoelectric ring 100 will also affect the dimensions of the cup member 92. With the selection of an appropriate piezoelectric material for ring 100 and the orientation of that material to respond in a direction substantially radially to piezoelectric ring 100, the piezoelectric ring 100 may be contracted or shrunk by the application of voltage 82 upon closure of switch 84. Since piezoelectric ring 100 is bonded or attached to cup 92, the outside diameter of upstanding wall 96 will decrease slightly with the application of voltage 82. Accordingly, the periphery of cup 92 may be pulled back or retracted from engagement with rotor 18, as illustrated in FIG. 4. With the voltage 82 applied to the piezoelectric composite crash stop ring 80, the gap created between the periphery of crash stop ring 80 and the rotor 18 will permit the rotor 18 to rotate about its axis of rotation without interference from the crash stop ring 80. The magnitude of the gap 63 formed by the contraction of crash stop ring 80 may be controlled by the magnitude of the voltage 82.

When the voltage 82 is interrupted by opening switch 84, the piezoelectric ring 100 will relax to its inactivated state and thereby expand the metal cup 92 until such time as the periphery of the cup 92 engages the interior surface 64 of rotor 18. With the crash stop ring 80 engaged with rotor 18, rotor 18 is immobilized and is prevented from any movement relative to shaft 12 within the structural capabilities of the materials of crash stop ring 80, bearing assemblies 16, 17, rotor 18, and shaft 12.

Effectively, the crash stop rings 80 share any shock loading which might be imparted to either shaft 12 or rotor 18. By sharing the shock forces imparted to rotor 18 or shaft 12 with the bearing assemblies 16, 17, the crash stop rings 80 thus increase the maximum shock load which may be experienced by the spindle motor assembly 10 and at the same time effectively raise the allowable shock loading of the motor 10 above that which may be sustained by the bearing assemblies 16, 17 alone without damage to the bearings 16, 17.

Figure 6:
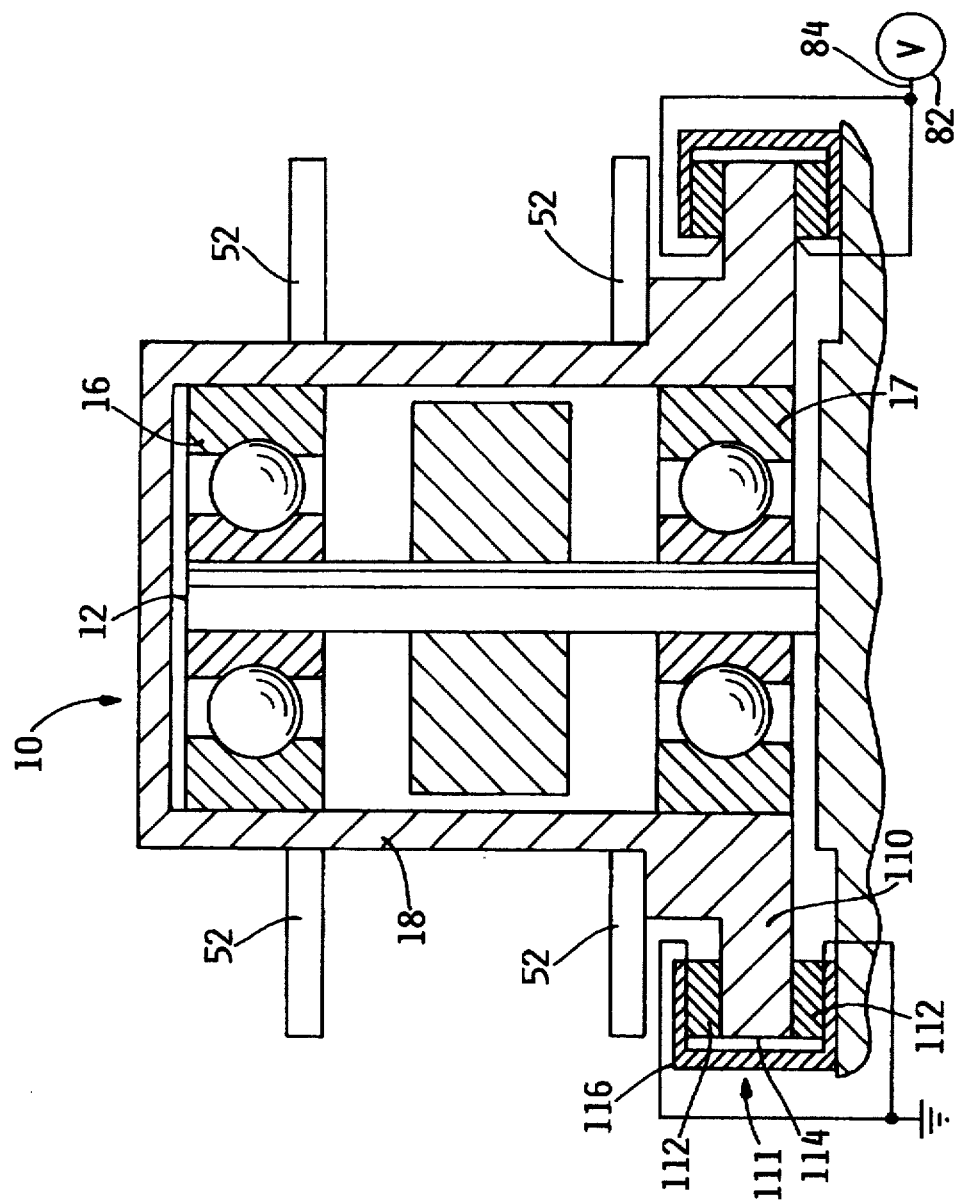
FIG. 6 illustrates a piezoelectric crash stop ring utilized to clamp a flange on the spindle motor rotor.

Another embodiment utilizing crash stop rings to immobilize undesirable movement of rotor 18 is illustrated in FIG. 6.

Similar to the other spindle motors illustrated in FIGS. 1 thru 4, rotor 18 supports magnetic disks 52 for rotation about shaft 12. Rotor 18 in FIG. 6 is provided with a flange 110 extending radially from the one end of rotor 18. Flange 110 is bracketed by two piezoelectric rings 112 forming a caliper 111 which is disposed and arranged to engage the planar surfaces of flange 110 near the periphery 114 of flange 110. Piezoelectric rings 112 are fixed to and supported by a clamp frame 116. Clamp frame 116 is an annular structure having a U-shaped cross-section. The dimensions of the caliper 111 which comprises piezoelectric rings 112 and clamp ring 116 are such that whenever the piezoelectric rings 112 are in their relaxed state the piezoelectric rings 112 will physically contact and forcibly engage the planar surfaces of flange 110. Voltage 82 when applied to the piezoelectric rings 112 by closing switch 84 causes the piezoelectric rings 112 to contract and reduce themselves in thickness in a direction substantially parallel to the axis of rotation of shaft 12. This reduction in thickness of piezoelectric rings 112 effectively retracts rings 112 from engagement with flange 110, releasing flange 110 for rotation about shaft 12.

Each time voltage 82 is disconnected from the piezoelectric rings 112, the piezoelectric rings 112 return to their relaxed state grasping and clamping flange 110, and movement of the rotor 18 by a shock or impact force being exerted onto the disk drive 10 is resisted by the clamping of the piezoelectric rings 112 onto flange 110, thereby reducing or eliminating the undesirable movement of rotor 18 which would ordinarily deform and potentially damage bearing assemblies 16, 17.

Piezoelectric rings 112 are fabricated from a suitable piezoelectric material such as quartz or lead-zirconate-titanate and the piezoelectric material is oriented such that the retraction of the piezoelectric material in a direction substantially normal to the plane of the piezoelectric material engaging flange 110 creates a clearance gap (not shown), between flange 110 and piezoelectric rings 112. The orientation of the two rings 112 is such that the retraction movement is in opposite directions thereby leaving a gap between each of the piezoelectric rings 112 and flange 110 upon the application of a sufficient voltage 82. With the reduction in thickness of the rings 112, flange 110 is free to rotate therebetween and thus rotor 18 is freed to operate in its normal and conventional fashion for data recording and retrieval. It should be understood that the significant aspect of this invention is to prevent movement of the rotor 18 with respect to the shaft 12, around or along either an X or Y axis or a combination of the two axes, whenever the Z axis is coincident to the axis of rotation of rotor 18 and shaft 12.

The caliper 111 may have the piezoelectric rings 112 formed in segments since the contraction/expansion direction is such that a complete ring is not necessary. The caliper 111 also may be fabricated with only a limited number of segments or pads engaging a portion of flange 110. The important factor to consider when determining the use of segments or pads to engage flange 110 is to provide sufficient grasping area in the caliper 111 to immobilize rotor 18.

By restricting the undesired moments and movements of rotor 18 with respect to shaft 12, the forces exerted on the races of the ball bearing assemblies 16, 17 of the spindle motor 10 are limited and maintained at less than those forces which will cause failure by indenting the race surface with the balls 24, 30 of the ball bearing assemblies 16, 17, to the point of permanent deformation.

Figure 7:
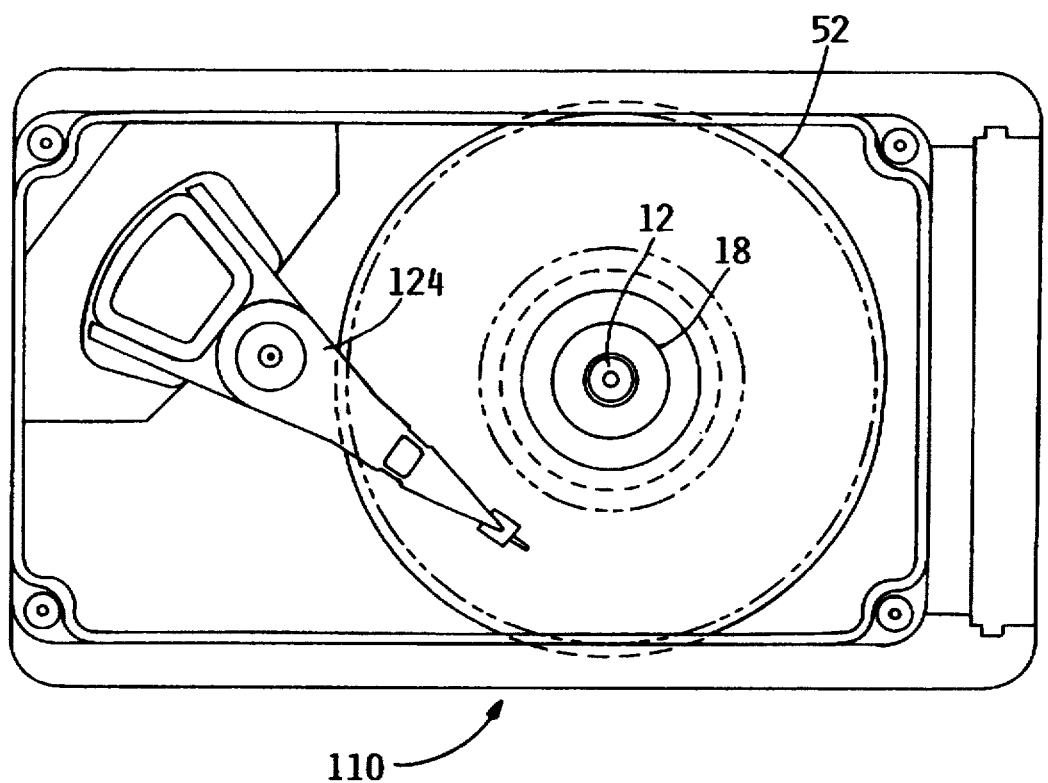
FIG. 7 illustrates a disk drive which may utilize the crash stop rings of this invention.

Referring to FIG. 7, a disk drive 110 is illustrated which may advantageously incorporate the crash stop rings of this invention. The disk drive 110 includes an actuator 124 and magnetic disk 52. Magnetic disk 52 is supported by rotor 18 which is in turn rotationally supported surrounding shaft 12.

It should be understood that the placement of the crash stop rings 60, 62 may be made at any number of varying locations along shaft 12. The essential aspect of the crash stop ring is to provide a very small gap 68 or 70 between the crash stop ring 60, 62 and either the shaft 12 or the rotor 18 of the spindle motor 10 such that upon movement of the rotor 18, the gap 68 or 70 will be reduced to the point where the crash stop ring 60, 62 will engage with a solid surface of shaft 12 or rotor 18 and prevent further undesired movement of rotor 18 relative to shaft 12. Once the crash stop ring 60, 62 is moved into engagement with either the shaft 12 or rotor 18, the crash stop ring 60, 62 can then absorb and share some of the forces and loading between shaft 12 and rotor 18 such that the ball bearing assemblies 16, 17 will not be stressed to the point of failure.

It should be further understood that other minor modifications may be made to the several embodiments described herein without departing from the scope of claims attached hereto.

We claim:

1. A disk drive for storing data comprising:

an electrical motor including a shaft and a rotor supporting at least one magnetic disk;

surrounding said shaft, a pair of ball bearing assemblies;

said rotor rotationally supported relative to said shaft by said pair of ball bearing assemblies;

said rotor comprising an interior cylindrical surface coaxial with said shaft; and at least one ring for preventing damage to said pair of ball bearing assemblies by blocking movement, of said rotor relative to said shaft in a radial direction, of sufficient magnitude to force components of said pair of ball bearing assemblies into engagement sufficiently to cause permanent deformation and damage to said components, said at least one ring for preventing damage attached to one of said shaft and said rotor and having a cylindrical surface in confronting relation to the other one of said shaft and said rotor and spaced from said other one of said shaft and said rotor by a first distance less than the distance said rotor must move relatively toward said shaft to cause permanent deformation of said components within said pair of ball bearing assemblies;

whereby said rotor is prevented from being displaced relative to said shaft sufficiently to permanently deform any of said components of any of said pair of ball bearing assemblies;

wherein said at least one ring is disposed on said shaft, intermediate said pair of ball bearing assemblies, and said at least one ring further comprises a piezoelectric material which contracts when an electrical potential is applied to said at least one ring, thereby creating a gap of said first distance.

2. A disk drive for storing data comprising:

an electrical motor including a shaft and a rotor supporting at least one magnetic disk;

surrounding said shaft, a pair of ball bearing assemblies;

said rotor rotationally supported relative to said shaft by said pair of ball bearing assemblies;

said rotor comprising an interior cylindrical surface coaxial with said shaft; and at least one ring for preventing damage to said pair of ball bearing assemblies by blocking movement, of said rotor relative to said shaft in a radial direction, of sufficient magnitude to force components of said pair of ball bearing assemblies into engagement sufficiently to cause permanent deformation and damage to said components, said at least one ring for preventing damage attached to one of said shaft and said rotor and having a cylindrical surface in confronting relation to the other one of said shaft and said rotor and spaced from said other one of said shaft and said rotor by a distance less than the distance said rotor must move relatively toward said shaft to cause permanent deformation of said components within said pair of ball bearing assemblies;

whereby said rotor is prevented from being displaced relative to said shaft sufficiently to permanently deform any of said components of any of said pair of ball bearing assemblies;

wherein said at least one ring comprises a pair of rings, each of said rings respectively disposed adjacent one of said pair of ball bearing assemblies, said rings having a metal portion and a piezoelectric portion bonded together, said piezoelectric portion contracting under an electrical potential, whereby said rings release engagement with said rotor when energized and engage said rotor when de-energized to prevent movement of said rotor relative to said shaft.

3. A shock damage prevention apparatus for preventing permanent deformation in components of ball bearing assemblies of a disk drive having a shaft and a rotor, said shaft and said rotor supported relative to each other by said ball bearing assemblies, said damage prevention apparatus comprising:

a ring for protecting said ball bearing assemblies from shock impacts, said ring disposed surrounding said shaft and having an outer surface complementary to an interior surface of said rotor, said ring having a radial width to form a gap between said ring and said interior surface of said rotor of a radial distance less than a distance said rotor must be displaced in the radial direction to effect permanent deformation of any portion of said ball bearing assemblies of said disk drive, wherein said ring is disposed on said shaft and intermediate said ball bearing assemblies and said ring comprises a piezoelectric portion which contracts in response to an electrical potential, whereby said outer surface of said ring and said interior surface of said rotor are each disengaged from the other when said ring is contracted and engaged with the other when said ring is not contracted.

* * * * *